INVENTORS
William D. Woolston
John J. Fitzgerald
BY *Ashley & Ashley*
ATTORNEYS

INVENTORS
William D. Woolston
John J. Fitzgerald
BY *Ehley & Ehley*
ATTORNEYS

United States Patent Office 3,093,469
Patented June 11, 1963

3,093,469
OIL MIST SEPARATOR
William D. Woolston and John J. Fitzgerald, Dallas, Tex., assignors to Vector Engineering Contractors, Inc., Dallas, Tex., a corporation of Texas
Filed Aug. 18, 1960, Ser. No. 50,480
4 Claims. (Cl. 55—324)

This invention relates to new and useful improvements in oil mist separators.

One object of the invention is to provide an improved separator for removing oil or other liquid entrained as a mist therein from a gaseous fluid, steam or air.

A particular object of the invention is to provide an improved separator wherein entrained liquid mist is removed from a fluid by first glomerating the liquid in droplets and then by baffling to cause the droplets to fall by gravity from the fluid as well as by adhering to and running down the surfaces of the glomerating and baffling means into a sump.

An important object of the invention is to provide an improved oil mist separator, of the character described, having one or more upright glomerators for receiving the fluid and converting the liquid mist to droplets and upright baffles surrounding and spaced from the glomerators so as to form a plurality of passages for conducting the fluid from said glomerators in a tortuous path whereby the droplets strike and roll down the surfaces of the baffles and fall by gravity from said fluid in addition to running down the exteriors of said glomerators.

Another object of the invention is to provide an improved oil mist separator, of the character described, wherein each glomerator is tubular and has a porous side wall to accommodate the flow of fluid therethrough, the side wall including a medium of sufficient density to impede the passage of ultra fine liquid particles whereby the particles strike and cling to the obstructions of the medium so as to glomerate in droplets which run down the exterior of said wall and which are carried therefrom by the fluid for separation by baffling.

A further object of the invention is to provide an improved oil mist separator, of the character described, wherein the baffles are arranged so as to impart abrupt changes of direction to the fluid as well as amplified contact surfaces so as to insure removal of the liquid by dropping out and impinging the surfaces.

A construction designed to carry out the invention will be hereinafter described, together with other features of the invention.

Figure 1:
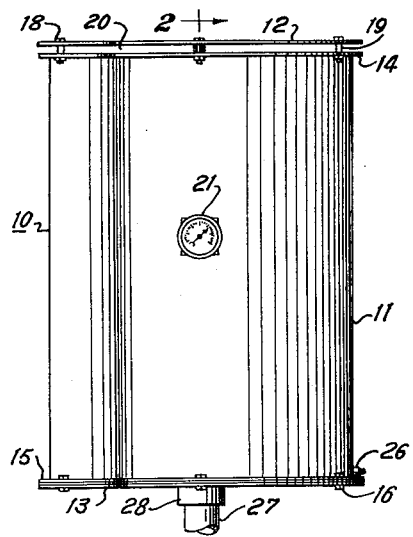
Figure 3:
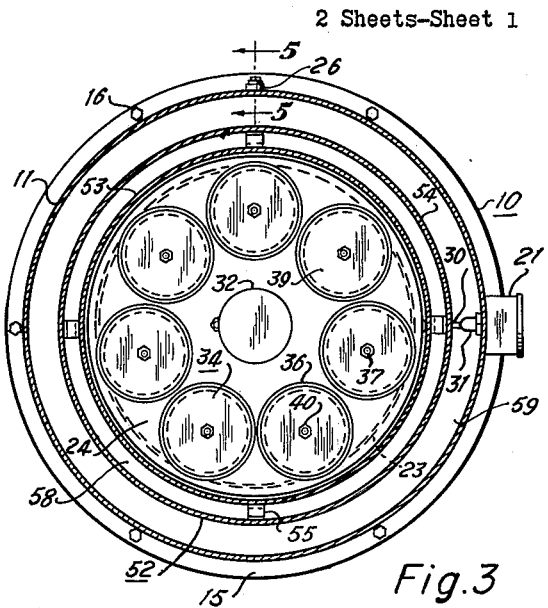
Figure 4:
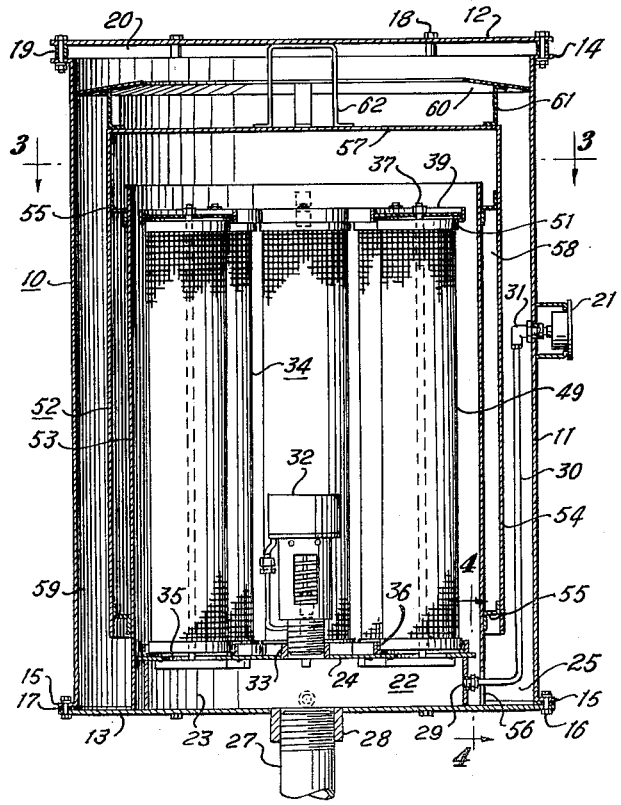
Figure 5:
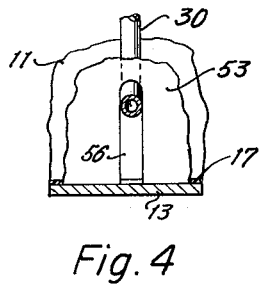
Figure 2:
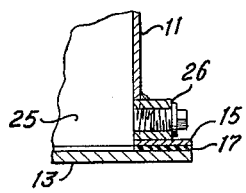
Figure 6:
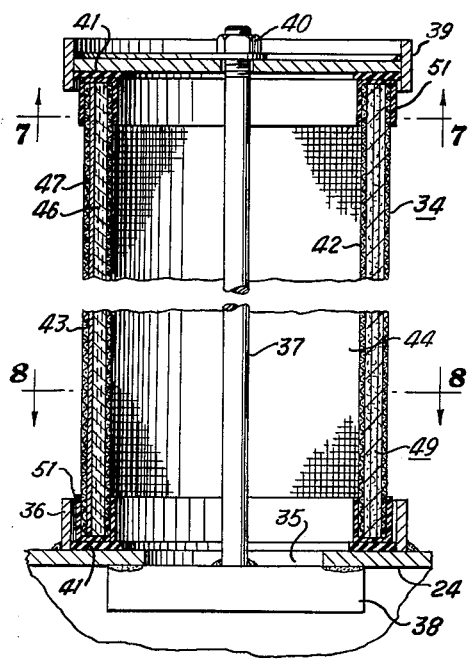
Figure 7:
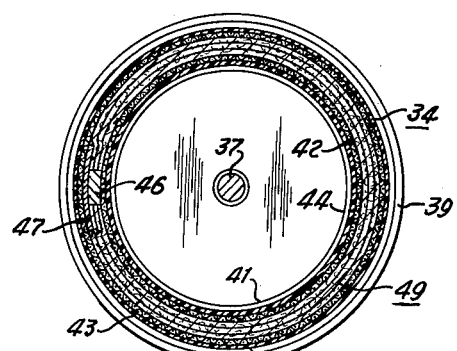
Figure 8:
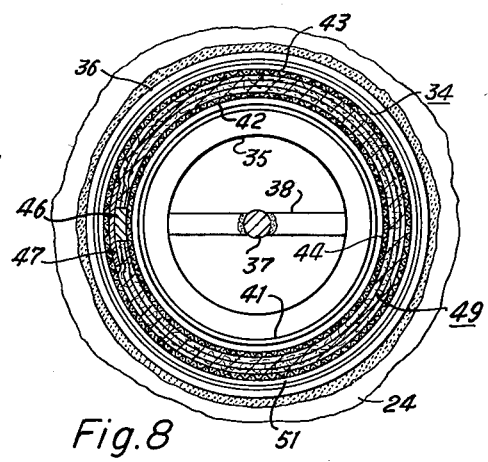
Figure 9:
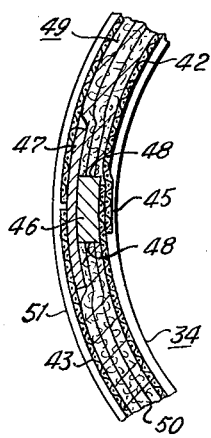
Figure 10:
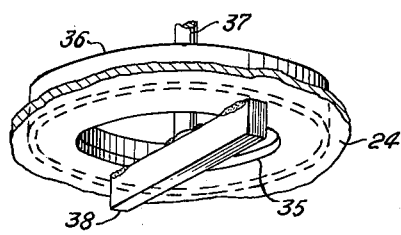

The invention will be more readily understood from a reading of the following specification and by reference to the accompanying drawings, wherein an example of the invention is shown, and wherein:

FIG. 1 is a side elevational view of an oil mist separator constructed in accordance with the invention, FIG, 2 is an enlarged, longitudinal, sectional view, taken on the line 2—2 of FIG. 1, FIG. 3 is a horizontal, cross-sectional view, taken on the line 3—3 of FIG. 2, FIG. 4 is an enlarged, transverse, vertical, sectional view, taken on the line 4—4 of FIG. 2, FIG. 5 is an enlarged, transverse, vertical, sectional view, taben on the line 5—5 of FIG. 3, FIG. 6 is an enlarged, longitudinal, sectional view of one of the glomerators, FIG. 7 is a horizontal, cross-sectional view, taken on the line 7—7 of FIG. 6, FIG. 8 is a horizontal, cross-sectional view, taken on the line 8—8 of FIG. 6, FIG. 9 is an enlarged, horizontal, cross-sectional view of a portion of the filter element, and FIG. 10 is an underside, perspective view showing the means for mounting one of the glomerators.

In the drawings, the numeral 10 designates the upright, cylindrical casing or housing of an oil mist separator having side, top and bottom walls 11, 12 and 13. External, radial flanges 14 and 15 are formed on the upper and lower ends of the side wall 11 for underlying and overlying the margins of the circular, flat top and bottom walls 12 and 13 (FIG. 2). The lower flange 15 is fastened to the bottom wall by bolts and nuts 16 and an annular, flat gasket 17 is confined therebetween to provide a fluid-tight joint. Bolts and nuts 18 connect the upper flange 14 to the top wall and carry spacers 19 to provide an annular outlet opening or space 20 between said flange and wall. A pressure gauge 21 is suitably mounted on the exterior of the side wall intermediate its ends.

A cylindrical, shallow chamber or plenum 22 is formed in the lower end portion of the housing by an annular, upright plate 23 welded to the bottom wall 13 and having a circular top plate 24 overlying and welded to its upper end (FIG. 2). The upright plate 23 is concentric to and of less diameter than the side wall 11 so as to be spaced therefrom. As will be explained, the space between the upright plate and side wall functions as an oil reservoir sump or liquid receiving space 25 and the side wall carries a suitable drain fitting 26 therefor (FIG. 5). An inlet pipe 27 communicates with the lower portion of the chamber 22 through a coupling 28 connected axially to the bottom wall. The upright plate 23 of the chamber has a fitting 29 for receiving the lower end of an angular tube 30 extending downwardly from the pressure gauge 21 and connected thereto by an elbow 31. A pressure relief valve 32 also communicates with the upper portion of the chamber 22 through a coupling 33 connected axially to the top plate 24. Also, the chamber communicates with one or more elongated, cylindrical, hollow elements or glomerators 34 which are supported by and upstand from the top plate in surrounding relation to the pressure relief valve 32 (FIGS. 2 and 3), preferably, being arranged in a circle.

As shown most clearly in FIG. 6, a circular opening 35 is formed in the top plate 24 for each glomerator 34 and is surrounded by an upstanding, concentric collar 36 of greater diameter. The glomerator is of greater diameter than the opening 35 and of less diameter than the collar 36 whereby its lower end engages within said collar and rests on the top plate in spaced, concentric relation to said opening. An elongated rod 37 extends axially upward through each opening and has its lower end welded to a flat bar 38 which underlies and diametrically bridges the opening, being welded to the underside of the plate 24 (FIG. 10). The rod 37 has a flanged cap 39, of substantially the same diameter as the collar, confined on its upper end by a nut 40 for overlying engagement with the upper end of the glomerator 34 so as to close said upper end and clamp said element against the top plate. Annular, flat gaskets 41 may overlie and underlie the upper and lower ends of the glomerator to seal off between said glomerator and the cap and top plate and prevent leakage therebetween.

Each glomerator 34 includes inner and outer, cylindrical shells or walls 42 and 43 of foraminous material, such as expanded metal, hardware cloth or wire screen, whereby the glomerator is tubular and has an unobstructed cylindrical interior or bore 44. As shown by the numeral 45 in FIG. 9, the inner shell 42 has its upright margins welded or otherwise secured together and to the inner surface of an upright, coextensive, flat bar 46 which may be slightly arcuate in cross-section so as to conform to the curvature of said shell. An arcuate, coextensive bar 47, of greater width and less thickness, overlies and is secured to the bar 46 so as to provide longitudinal grooves or recesses 48 on both sides of said bar 46 for receiving the upright margins of a glomerating medium 49. The upright margins of the outer shell 43 overlie and are secured to the exterior of the bar 46. Preferably, the glomerating medium 49 is formed of glass or other suitable fibers and is applied in layers 50 to facilitate the dense compaction thereof before the outer shell is secured in place. For sealing the ends of the glomerator and providing smooth surfaces for engagement with the gaskets 41, caps 51 of polyester resin or other suitable plastic material enclose said ends which may be embedded in the material.

It is essential that the glomerating medium 49 of each glomerator be of a density sufficient to impede the passage of ultra fine oil or other liquid particles entrained as mist in a gaseous fluid, steam or air under pressure which is discharged from a mechanism, such as air from a vacuum pump (not shown), whereby the oil particles strike and cling to the fibers of said medium so as to glomerate in droplets. The air stream enters the chamber 22 through the inlet pipe 27, accumulating in said chamber, and then flows upwardly through the openings 35 of the top plate 24 into the bores 44 of the glomerators 34. Since the upper and lower ends of the glomerators are sealed, the air stream is forced to flow laterally through the medium 49. Preferably, the glomerating medium is formed of extremely fine silicon fibers and is fabricated into cylindrical shape, such as by the layers 50, having a thickness of approximately ¼ of an inch. The fibers are compacted to provide a density of 7.2 pounds per cubic foot. With this density and thickness, the area of the medium is sufficient to permit flow therethrough at a velocity of approximately 35 feet per minute through each glomerator. It is noted that the glomerating medium provides a porous side wall for each glomerator and is confined in its densely compacted condition by the inner and outer shells 42 and 43.

Although most of the oil droplets run down the exteriors of the glomerators 34 into the sump 25, a portion of said droplets are blown off or carried laterally from said glomerators by the air stream. In order to separate the latter oil droplets from the air stream, a baffle assembly 52 encloses the glomerators and includes a pair of upright, cylindrical baffles or partitions 53 and 54 which are connected in concentric, spaced relationship by a plurality of upper and lower angular brackets or supports 55 (FIGS. 2 and 3). The inner baffle 53 extends below the outer baffle 54 so as to rest on the housing bottom wall 13 for supporting the assembly 52, being of greater diameter than and concentrically surrounding the upright chamber plate 23. An upright, elongated opening or slot 56 (FIG. 4) is formed in the lower end of the inner baffle to accommodate the tube 30 and establish communication between the portions of the sump internally and externally of said baffle. During operation, the opening 56 as well as the lower end of the inner baffle is sealed by the oil that accumulates in the sump 25 whereby the air is forced to flow around the upper end of said baffle. Since the upper end of the inner baffle extends above the glomerators, the larger oil droplets strike and roll down this baffle into the sump and a 90° turn is imparted to the air. A circular, flat partition or wall 57 is welded to and closes the upper end of the outer baffle 54, which extends above the inner baffle 53, whereby the air can only flow downwardly through the annulus or passage 58 between said baffles. Due to this 180° turning of the air, the oil droplets impinge the outer baffle and tend to adhere thereto so as to roll down into the sump. The lower end of the outer baffle terminates above the oil level in the sump so as to permit the flow of air therearound into the annulus or passage 59 formed by the concentric spacing of said baffle from the housing side wall 11. This imparts another 180° turn to the air and causes dropping out of additional oil particles from the upwardly flowing air. Of course, some of the oil strikes the inner surface of the side wall so as to collect thereon and run down into the sump 25.

A frusto-conical, transverse deflector or hood 60 overlies and closes the upper end of the annulus 59, being connected in spaced relation to the circular partition 57 by a plurality of angular brackets or supports 61 which provide lateral flow spaces therebetween. The deflector 60 has a snug sliding fit with the inner surface of the housing side wall 11 and extends inwardly of the upright baffles whereby the air must turn 270° in order to escape through the outlet space 20 between the upper end of said side wall and the top wall 12. Manifestly, any oil remaining entrained in the air impinges the deflector and clings thereto, collecting thereon and rolling down said deflector and the side wall into the sump. It is noted that the air is subjected to pronounced turns or changes of direction and different cross-sections which reduce the velocity of said air sufficiently to cause substantially complete separation of the oil therefrom. For example, the velocity may be approximately 1300 feet per minute in the annulus 58, approximately 700 feet per minute in the annulus 59, and approximately 300 feet per minute in the space 20. This reduction in velocity prevents oil from being carried out of the separator by the air stream. In addition to striking and rolling down the surfaces of the baffle assembly as well as the housing side wall, a portion of the oil drops out of the air stream due to gravity. The pressure relief valve is set to open when an excessive pressure occurs in the chamber 22 so as to prevent damage to either the separator or the mechanism to which said separator is connected, as well as permitting control of velocity of the air stream and insuring separation of the oil therefrom. This excessive pressure is indicated by the gauge 21 and, usually, is due to the clogging of the glomerators 34 by lint, dirt or other foreign matter. The gauge shows when the relief valve is about to open and permit the air to bypass the glomerators. If the gauge consistently indicates a high pressure, the glomerators are partially closed and should be changed. A bail or handle 62 may be secured to the partition 57 to facilitate insertion and removal of the baffle assembly 52 and access to the glomerators. With the baffle assembly removed, the glomerators may be easily removed for cleaning or replacement.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A separator for removing liquid from a gaseous fluid including an upright housing having an outlet at its upper portion, a chamber in the lower portion of the housing and having an inlet for receiving a gaseous fluid, an upright tubular glomerating element having a closed upper end and its lower end communicating with the chamber, the element having a side wall of fibrous material which is densely compacted to impede the passage of liquid therethrough and glomerate the liquid in droplets, a baffle assembly surrounding and separating said glomerating element from the outlet, the baffle assembled including a pair of upright concentric partitions spaced annularly from said housing and element, a transverse partition at the upper end of the outer partition closing the upper end of the baffle assembly, the inner partition extending above said element and terminating below the transverse partition, said outer partition terminating above the lower end of said inner partition, whereby the fluid is forced to flow upwardly around said element and downwardly between the partitions and upwardly around said outer partition to said outlet so as to separate the liquid droplets from the fluid by gravity and by impingement with said partitions, and a liquid collecting space in the lower portion of said housing communicating with the spaces internally and externally of said assembly and between its partitions to receive the liquid droplets which drop out of the fluid and which run down the upright surfaces of said element, partitions and housing.

2. A separator as set forth in claim 1 including a transverse deflector overlying and spaced from the upper end of the outer partition, the deflector extending from the upright surface of the housing and terminating inwardly of said outer partition so as to direct the fluid inwardly from the space between said partition and housing, the outlet of said housing being above and outwardly of the inner portion of said deflector.

3. A separator as set forth in claim 2 wherein the housing includes an upright side wall, and a removable top wall overlying and spaced from the upper end of the side wall so as to provide the outlet of said housing.

4. A separator for removing liquid from a gaseous fluid including a housing having an outlet, a chamber in the housing having an inlet for receiving a gaseous fluid, a tubular glomerating element having its inner end communicating with the chamber and its outer end closed, the element having a side wall of fibrous material which is densely compacted to impede the passage of liquid therethrough and glomerate the liquid in droplets, a baffle assembly surrounding and separating said element from the outlet, the baffle assembly including a pair of concentric partitions extending longitudinally of said element and spaced from said housing and element to provide passages externally and internally of said assembly and between its inner and outer partitions, a transverse partition at the outer end of the outer partition closing the outer end of said assembly, the inner partition extending outwardly of said element and terminating inwardly of the transverse partition, said outer partition having its inner end terminating outwardly of the inner end of said inner partition whereby the fluid is forced to flow longitudinally outward around said element and longitudinally inward between the partitions and longitudinally outward through the passage externally of said assembly to said outlet so as to separate the liquid droplets from the fluid by gravity and by impingement with said partitions, and a transverse deflector overlying and spaced from the outer end of said outer partition, the deflector extending from said housing and terminating transversely inward of said outer partition so as to direct the fluid transversely inward from said external passage, said outlet being longitudinally and transversely outward of the inner portion of said deflector.

References Cited in the file of this patent

UNITED STATES PATENTS

| | | |
|---|---|---|
| 968,534 | Brown | Aug. 30, 1910 |
| 1,820,530 | Davies | Aug. 25, 1931 |
| 1,864,201 | Kegerreis et al. | June 21, 1932 |
| 2,252,174 | Glab | Aug. 12, 1941 |
| 2,354,722 | Walton | Aug. 1, 1944 |
| 2,521,785 | Goodloe | Sept. 12, 1950 |
| 2,745,513 | Massey | May 15, 1956 |
| 2,771,153 | Hennig | Nov. 20, 1956 |
| 2,941,620 | Thornburgh | June 21, 1960 |
| 2,970,671 | Warner | Feb. 7, 1961 |

FOREIGN PATENTS

| | | |
|---|---|---|
| 220,471 | Switzerland | July 1, 1942 |